March 24, 1942.  R. H. IMES  2,277,107

CLUTCH FACING

Filed Jan. 4, 1940

INVENTOR
Robert H. Imes
BY
ATTORNEY

Patented Mar. 24, 1942

2,277,107

UNITED STATES PATENT OFFICE 2,277,107

CLUTCH FACING

Robert H. Imes, Indianapolis, Ind., assignor to P. R. Mallory & Co., Inc., Indianapolis, Ind., a corporation of Delaware Application January 4, 1940, Serial No. 312,341

1 Claim. (Cl. 192—107)

This invention relates to clutch facing elements.

An object of the invention is to improve clutch facing elements.

Another object is to produce a composite semi-flexible metallic clutch facing element prepared from metal powders.

Other objects of the invention will be apparent from the following description and accompanying drawing taken in connection with the appended claim.

The invention comprises the features of construction, combination of elements, arrangement of parts, and methods of manufacture and operation referred to above or which will be brought out and exemplified in the disclosure hereinafter set forth, including the illustrations in the drawing.

Figure 1:
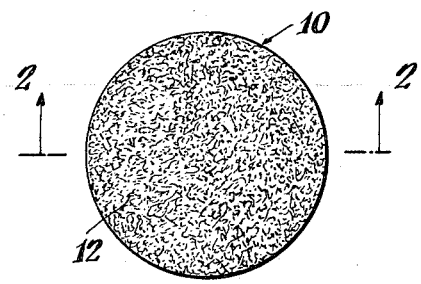
Figure 1 is a face view of a clutch facing disc embodying features of the present invention.
Figure 4:
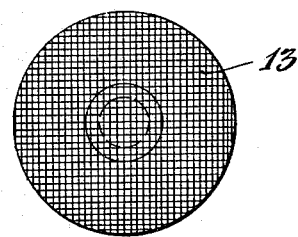
Figure 4 is a face view of a reenforcing element.

A feature of the present invention resides in the improved semi-flexible metallic structure and method of production thereof illustrated in the figures of the drawing and described more in detail hereafter.

While a preferred embodiment of the invention is described herein, it is contemplated that considerable variation may be made in the method of procedure and the construction of parts without departing from the spirit of the invention. In the following description and in the claim, parts will be identified my specific names for convenience, but they are intended to be as generic in their application to similar parts as the art will permit.

Referring to the drawing Figure 1 is a face view of the clutch facing element or button disc 10. This facing element or disc is fabricated from a copper base material containing finely divided and dispersed inclusions of lead and graphite and also including a low melting point ingredient capable of alloying with the copper such as zinc or tin. The composition is preferably formed from granular or powder material such as a mixture of powdered copper, tin, lead and graphite. For utilization as a clutch facing disc the elements may conveniently, although not necessarily, have a circular disc shape as shown. The exposed wearing surface 12 may preferably be flat although in some cases the surface may be curved, convex, cylindrical, hemispherical, pointed or otherwise shaped as desired.

Within the body 11 of the element and integrally bonded thereto is a reenforcement 13. This reenforcement is preferably characterized by a foraminous or strand-like structure, preferably being a network such as a wire mesh, in the form of a comparatively thin sheet with a shape corresponding to the shape of the body 11 within which it is embedded. It will be apparent, however, that other forms of base structure may be used in place of wire mesh. For example, a foraminous sheet member may be used having suitable projections or irregularities on its surface which will provide adequate bonding between the base and the substance forming the body 11 or unwoven wire strands may be used.

In fabricating the composite structure, reenforcement 13 is preferably of slightly lesser extent than the body 11 and concentric therewith so that said base is entirely embedded within the body 11. Reenforcement 13 reenforces the completed structure so as to impart flexibility into the clutch facing member. The materials which are used in the composition of the clutch facing member and the method by which same is produced would result in a material which will have the desirable wearing qualities which would lack, however, sufficient ductility to perform well under the stresses and deformations which the material has to stand in service. The reenforcement also enables more secure attachment to a support by the use of a suitable integral or nonintegral attaching member, such as rivet, welding projection or other securing means integrally welded to the reenforcement, as illustrated in Figure 2 or separately applied to structures of the type illustrated in Figure 3 by tapping.

Figure 2:
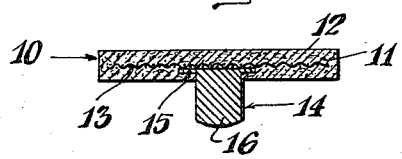
Figure 2 is a section on the line 2—2 of Figure 1.
Figure 5:
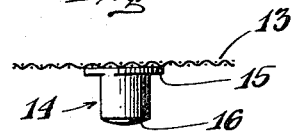
Figure 5 is a side view of the element thereof.
Figure 3:
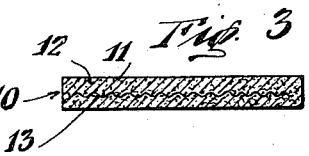
Figure 3 is a section of a modified construction.

The attachment shown in Figure 2 comprises a rivet or welding projection 14, the head 15 of which lies flatwise against the reenforcement layer 13. The shank 16 of the attaching means projects from the body portion 11 to enable attachment to a suitable support. The reenforcement 13 is permanently and integrally secured to the head 15 by welding, pressing or otherwise.

In the fabrication of my improved composite structure I prefer to employ a metal powder mixture within the following range of composition:

|  | Per cent |
|---|---|
| Carbon | 6 to 18 |
| Tin and/or zinc powder | 4 to 12 |
| Lead powder | 6 to 20 |
| Copper powder | 50 to 80 |

Several preferred compositions within the specified range are the following:

|  | Per cent by weight |
|---|---|
| A. Graphite | 13.7 |
| Tin | 7.2 |
| Lead | 12.3 |
| Copper | 66.8 |
| B. Graphite | 6 |
| Tin | 5 |
| Zinc | 3 |
| Lead | 10 |
| Copper | 76 |
| C. Graphite | 15 |
| Tin | 7 |
| Zinc | 5 |
| Lead | 18 |
| Copper | 55 |
| D. Graphite | 10 |
| Zinc | 10 |
| Lead | 12 |
| Copper | 68 |

It can be seen from the above compositions that the selection of elements was made in such a manner as to provide enough zinc and/or tin in relationship to the copper content to form either a binary solid solution of tin and/or zinc and copper or a ternary solid solution. This formation of solid solution is accomplished during the sintering process described below. It is an essential part of the present invention to provide a solid solution of copper with either tin or zinc in order to obtain a copper base material having sufficient strength and resistance to abrasion to perform well as a clutch facing. It is also necessary that the soft powders such as tin and/or zinc are diffused either completely or to a large extent because if they remain entirely undiffused they will not improve the physical characteristics of the powder composite metal body in order to make the material suitable for the purpose intended in the present invention. For all practical purposes compositions are selected which form solid solutions with the copper base matrix. It is possible, however, to have an excess of tin present which will be in the form of a so-called better constituent.

Figure 6:
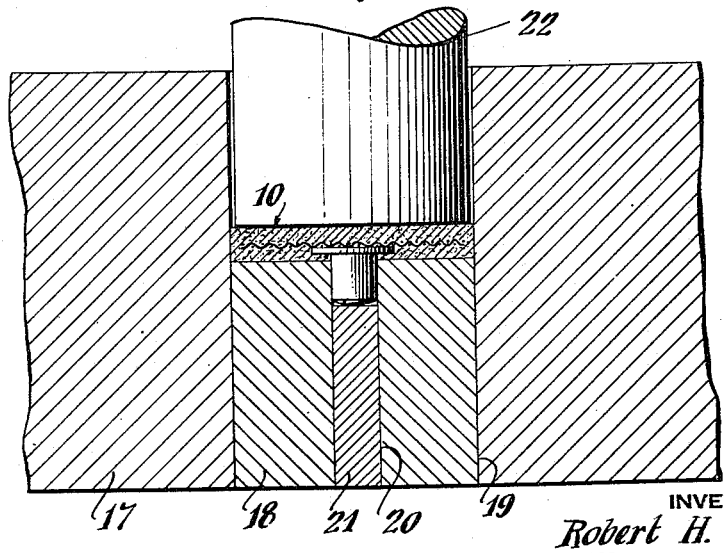
Figure 6 illustrates one method of making the clutch facing disc.

Figure 6 illustrates a preferred method of forming the clutch facing element. The forming and pressing may conveniently be obtained in a press comprising a continuous hollow die 17, a lower die 18 provided within the central opening 19 of the hollow die. Lower die 18 may be centrally bored as at 20 for receiving a shank holder 21 therein. An upper die or plunger 22 is adapted to be introduced into the opening 19 at the top thereof and apply the desired pressure.

Reenforcement 13 and its attaching rivet 14, where used, are placed in position in the die and the powdered metal mixture is suitably distributed about them and smoothened out to form a regular and uniform mass having a smoother surface. Pressure is then applied by plunger 22. I found a suitable pressure to be from 10 to 12 tons per square inch for the compositions described above.

After the element has been thus molded and compacted the pressed article is removed from the die and placed in a furnace where it is sintered or heat treated. The heating is preferably performed in a reducing atmosphere such as hydrogen gas or in a sealed boat with the articles packed in pre-fired charcoal, or a gas fired furnace using excess gas may be used. Temperatures which can suitably be used for sintering and heat treating are between 400 and 700 degrees C., the preferred temperatures being within the range of 650 degrees C. to 700 degrees C.

The graphite can be uniformly distributed by properly ball milling the powder composition before pressing. It is important to give careful attention to the distribution of the graphite, for unless properly mixed, the metal powders and graphite are liable to separate, due to the difference in specific gravity. It is also important that the lead particles are uniformly distributed and are of a specific size. It is, therefore, necessary to use a lead powder of a specific mesh which should be within the range of 100 to 400 mesh and preferably 250 to 300 mesh. If lead particles are used of different size the friction properties of the clutch facing member will be greatly impaired.

In the manufacture of my clutch facing material I prefer to use metal powders of a mesh which is finer than 100 mesh. This facilitates not only the mixing and therefore provides a more homogeneous body but also hastens the diffusion of the tin or zinc into the copper. In the pressing of the powder the same should be spread uniformly in the die to avoid soft spots in the finished article. The sintering should be continued long enough and at a high enough temperature to produce the desired diffusion of the tin or zinc into the copper but excessive temperatures should be avoided as they tend to cause globules of lead to form on the surface, thereby spoiling the resultant product.

The composite structure thus formed may be hardened by cold working if desired. The cold working tends to decrease the coefficient of friction. Hence for some applications cold working will be found desirable while for others the cold working may be dispensed with. Cold working is usually applied in the form of a recoining or more generally a repressing operation. Tests on facing discs of this material showed a decrease in the coefficient of friction from 0.20 to 0.15 with a cold working amounting to repressing to the extent of six and one-half tons per square inch. This fact is easily explained because the cold pressing operation provides a much smoother material with a burnished surface.

The reenforcing member may be formed of any suitable strong metal such as iron base, copper base or nickel base alloys and also of galvanized or other surface coated metals. It is necessary, however, that only materials are used which will not fuse during the sintering temperatures that are employed in our process. It is advantageous if a diffusion of some of the powder metal particles occurs with the reenforcing member because a stronger bond will result from such a diffusion process. The rivet or welding projection 14 may likewise be of any suitable metal such as steel, copper, bronze.

The composite element formed according to the present invention is capable of being flexed or bent within the extent normally encountered in service without fracturing and even if bent to the extent of fracture will remain an integral body due to the reenforcing member and can still serve the function as an operative facing element. The structure may be machined, ground, or drilled with ease and may be cut into sheets or discs of various sizes and shapes to adapt it to particular structures.

I am aware that in the prior art powdered metal structures have been described containing the similar ingredients as are contemplated in the present invention. I have tried materials of such compositions which are usually of a porous character and the pores of which are impregnated with a lubricant. Materials of that nature with or without lubricants have been found entirely unsuitable for the applications for which my material has been developed because the clutch facing would either fracture prematurely in service or would not provide sufficient friction.

I am aware of the fact that reenforcing members have been used previously in facing compositions and more particularly in structures which were designed for the same purpose as was considered in the present invention. My material, however, is distinguished from the prior art in that it provides a fundamentally metallic body not containing asbestos or any nonmetallic type ingredient other than graphite. My tests with such type of materials have shown that it is very difficult to obtain a firm coherent structure which would not fracture in service. I have found that it is necessary to have a base material which consists predominantly of a copper matrix capable of holding a certain amount of graphite without losing its coherent and firm structure.

While the present invention, as to its objects and advantages, has been described herein as carried out in specific embodiments thereof, it is not desired to be limited thereby but it is intended to cover the invention broadly within the spirit and scope of the appended claim.

What is claimed is:

A metallic clutch facing element comprising a disc formed of a mass of mixed particles of copper, graphite and lower melting point metal selected from the group consisting of lead, tin and zinc sintered together, a wire mesh reenforcement disc within said mass, said particles being sintered to said mesh, and a metal attaching member having a head and a shank, the head of said member being secured to said mesh by metal fusion and the shank projecting from one face of said facing element.

ROBERT H. IMES.